US012811171B2

(12) United States Patent
Meloan et al.

(10) Patent No.: US 12,811,171 B2
(45) Date of Patent: Nov. 24, 2026

(54) FILTRATION APPLICATIONS IN A REDOX FLOW BATTERY

(71) Applicant: UOP LLC, Des Plaines, IL (US)

(72) Inventors: Marisa Meloan, Chicago, IL (US); Zara Osman, Glenview, IL (US); Russell D. Schumaker, Glen Ellyn, IL (US); Jinfeng Wu, Kildeer, IL (US); Stuart R. Miller, Arlington Heights, IL (US); David E. Gray, Homer Glen, IL (US)

(73) Assignee: UOP LLC, Des Plaines, IL (US)

( * ) Notice: Subject to any disclaimer, the term of this patent is extended or adjusted under 35 U.S.C. 154(b) by 718 days.

(21) Appl. No.: 18/315,287

(22) Filed: May 10, 2023

(65) Prior Publication Data

US 2023/0387431 A1 Nov. 30, 2023

Related U.S. Application Data

(60) Provisional application No. 63/345,744, filed on May 25, 2022.

(51) Int. Cl.
*H01M 8/04276* (2016.01)
*H01M 8/04082* (2016.01)
*H01M 8/18* (2006.01)

(52) U.S. Cl.
CPC ... *H01M 8/04276* (2013.01); *H01M 8/04201* (2013.01); *H01M 8/188* (2013.01)

(58) Field of Classification Search
None
See application file for complete search history.

(56) References Cited

U.S. PATENT DOCUMENTS

2008/0220318 A1 9/2008 Brereton et al.
2014/0193673 A1 7/2014 Woolery et al.
2018/0269512 A1* 9/2018 Dong .................... H01M 8/188
2018/0316037 A1* 11/2018 Song ................. H01M 8/04932
2020/0266465 A1 8/2020 D'Anzi et al.
2022/0158213 A1 5/2022 Li et al.
2022/0158214 A1* 5/2022 Li ..................... H01M 8/04186

FOREIGN PATENT DOCUMENTS

CN 110048147 A 7/2019
KR 20190072000 A 6/2019

OTHER PUBLICATIONS

International Search Report from corresponding PCT application No. PCT/US2023/023250, mailed Sep. 12, 2023.
Written Opinion from corresponding PCT application No. PCT/US2023/023250, mailed Sep. 12, 2023.
Extended European Search report from corresponding European application No. 238246.5, dated Apr. 8, 2026.

* cited by examiner

*Primary Examiner* — Scott J. Chmielecki

(57) ABSTRACT

Processes for limiting circulation of precipitates in a redox flow battery system are described. The processes include filtering the negative electrolyte, or the positive electrolyte, or both in one or more filters. The filter(s) can be located in the negative electrolyte loop, the positive electrolyte loop, or in both loops. Filtering can take place in normal operation; it can also take place during refresh cycles.

18 Claims, 11 Drawing Sheets

FILTRATION APPLICATIONS IN A REDOX FLOW BATTERY

RELATED APPLICATIONS

This application claims priority to U.S. Provisional Patent Application Ser. No. 63/345,744 filed on May 25, 2022, the entirety of which is incorporated herein by reference.

BACKGROUND OF THE INVENTION

Energy storage systems play a key role in harvesting and storing energy from a variety of sources for use in a multitude of applications and industries, including building, transportation, utility, and industry. A variety of energy storage systems have been used commercially with new systems currently being developed to meet future storage demands. The development of cost-effective and eco-friendly energy storage systems is essential to solve the energy crisis and to overcome the mismatch between generation and end use. Energy storage solutions currently being explored include electrochemical and battery, thermal, thermochemical, flywheel, compressed air, pumped hydropower, magnetic, biological, chemical and hydrogen energy storage.

Renewable energy sources, such as wind and solar power, have transient characteristics because they rely on environmental conditions and would benefit from associated energy storage to provide power when the wind is not blowing, and the sun is not shining. Battery Energy Storage Systems (BESSs) such as redox flow batteries (RFBs) have attracted significant attention for large-scale stationary applications such as grid scale energy storage. Some of the earliest published work detailing the storage of electrical energy using a redox flow cell dates back to the 1950s when German Chemist Dr. Carl Walther Nicolai Kangro studied the process of storing electrical energy in liquids, using $Fe^{3+}/Fe^{2+}$, $Cr^{6+}/Cr^{3+}$, $Ti^{4+}/Ti^{3+}$, and $Cl^{-}/Cl_2$ redox couples. In the 1970s, NASA continued to work in this area produced the first iron chromium redox flow battery in 1973 to store energy at a future moon base. Although interest in establishing a base on the moon faded, flow battery research continued into other chemistries, including zinc-bromine and all-iron flow batteries. In 1981, Hruska et al. demonstrated the ability to cycle an all-iron redox flow battery (IFB) which is an attractive battery energy storage device for large scale energy storage applications such as load leveling and solar storage owing to the use of low cost and abundantly available iron, salt, and water as the electrolyte and the chemically safe nature of the system. (Investigation of Factors Affecting Performance of the Iron-Redox Battery, J. Electrochem. Soc., Vol. 28, No. 1, p. 18-25, January, 1981). Later in the 1980s, Skyllas-Kazacos et al from the University of New South Wales, Australia built a prototype vanadium redox flow-battery, leveraging the redox solution chemistry of $V^{2+}/V^{3+}$ and $V^{4+}/V^{5+}$. Over the last 40 years, considerable efforts have been made into developing all aspects of flow batteries.

In their simplest form, RFBs are electrochemical energy storage systems that reversibly convert chemical energy directly to electricity. They are typically composed of two external storage tanks filled with active materials comprising-ions that may be in different valance states, two circulation pumps, and a flow cell with a porous separator which is located between the anode and the cathode and is used to separate the anolyte and the catholyte, as well as to utilize the current circuit by allowing the transfer of balancing ions.

The anolyte, catholyte, anode, and cathode are commonly referred to as the negative electrolyte, positive electrolyte, negative electrode, and positive electrode, respectively.

The all-vanadium redox flow batteries (VRFB) have been the most extensively studied systems because they use the same active species in both half cells, which prevents contamination of electrolytes from one half cell to the other half cell through crossover at the membrane. However, VRFBs are inherently expensive due to the use of high-cost vanadium.

Similar to VRFBs, all-iron redox flow batteries leverage the same active species (Fe) in different valance states in both the positive and negative electrolytes for the positive and negative electrodes, respectively. The iron-based electrolyte solutions are stored in external storage tanks and flow through the stacks of the batteries. The positive electrode side half-cell reaction involves $Fe^{2+}$ losing electrons to form $Fe^{3+}$ during charge and $Fe^{3+}$ gaining electrons to form $Fe^{2+}$ during discharge; the reaction is given by Equation 1. The negative electrode side half-cell reaction involves the deposition and dissolution of iron in the form of a solid plate; the reaction is given by Equation 2. The overall reaction is shown in Equation 3.

$$\text{Redox electrode: } 2Fe^{2+} \leftrightarrow Fe^{3+} + 2e^{-} + 0.77V \quad (1)$$

$$\text{Plating electrode: } Fe^{2+} + 2e^{-} \leftrightarrow FeO - 0.44V \quad (2)$$

$$\text{Total: } 3Fe^{2+} \leftrightarrow FeO + 2Fe^{3+} 1.21V \quad (3)$$

During the normal operation of an RFB, small inefficiencies can create large problems over the lifetime of the battery. These problems can stem from several sources such as: cross-over of active species across the membrane, parasitic side reactions, or incomplete discharging of the battery. Even small inefficiencies can eventually result in a poorly performing battery in a product designed to last more than 20,000 cycles. Engineering designs are often required to inhibit or correct these inefficiencies.

Mixing the electrolytes together to rebalance and refresh the system is one way used to rebalance redox flow batteries. Typically, this may involve completely mixing the electrolyte solutions (negative electrolyte and positive electrolyte). The electrolytes are then appropriately re-apportioned to the initial volumes. This process often rectifies several issues in RFBs, including a volume differential driven by osmotic pressure, redistribution of active species and supporting electrolyte, and the modulation of pH on both sides. Once the negative electrolyte and positive electrolyte are mixed together, the resulting solution contains an average of the concentration of the components in the original negative electrolyte and positive electrolyte solutions.

Maintaining optimal operating conditions within a redox flow battery often requires engineering controls to manage the health of the battery and the relative health of the electrolyte. In redox flow batteries which utilize the $Fe^{2+}/Fe^{3+}$ redox couple, system inefficiencies associated with battery cycling can result in the accumulation of ferric cations in the electrolyte, which, if left unmanaged, can lead to reduced battery capacity.

The parasitic evolution of $H_2(g)$ has been a technical challenge associated with redox flow battery technologies for over 40 years. In 1979, Thaller reported the importance of a rebalance cell in iron-chromium RFBs to address the minor reaction (hydrogen evolution) at the chromium electrode. (U.S. Pat. No. 4,159,366). $H^2$ generated within all the cells was collected and directed to the hydrogen (negative) electrode of the rebalance cell, and the positive electrode of the rebalance cell receives the $Fe^{2+}/Fe^{3+}$ flow from the rest of the system. The electrochemical reactions which occur in the rebalance cell are opposite to the undesirable reactions which occur in the redox cell and are self-regulating (limited by the total H2 availability). The open circuit voltage of a $H_2/Fe^{3+}$ rebalance cell is about 0.7V, so energy is produced rather than consumed in the rebalance process, demonstrating the electrochemical recombination of $H_2$. In 2005, Noah et al. reported the use of the same rebalancing principle to improve the efficiency of the conventional copper electrowinning process which uses the water hydrolysis reaction as the anodic source of electrons. (Hydrogen Reduction of Ferric Ions for Use in Copper Electrowinning, Idaho National Engineering and Environmental Laboratory, INEEL/EXT-05-02602, January 2005). In order to improve energy efficiency, an alternative anodic reaction of ferrous ion oxidation was proposed, and $H_2$ was used as an effective reductant of the ferric cation. Unlike the work of Thaller, where the ferric cations in the electrolyte and $H_2$ gas were passed next each other separated by a membrane in an electrochemical cell, Noah et al leveraged a trickle bed column reactor, demonstrating the catalytic reduction of ferric cations, and circulating a ferric ion electrolyte by pumping electrolyte solution to the top of the reactor from a reservoir. The electrolyte drained by gravity through the bed and into the reservoir directly below the reactor. $H_2$ was introduced to the bed through a small tube at the bottom and flowed upward through the bed and vented through an exit tube.

Current processes and systems employed for rebalancing the all-iron RFB cells are concerned with the reduction of $Fe^{3+}$ to $Fe^{2+}$ to control the state of charge of the positive electrolyte. Different engineering approaches (electrochemical or catalytic) have demonstrated electrolyte rebalance within all-iron redox flow batteries; however, the basic principle of ferric ion reduction remains largely unchanged from that taught by Thaller and Noah, where $H_2(g)$ is oxidized to yield protons ($2H^+$) and electrons ($2e^-$) which enables the catalytic reduction of $Fe^{3+}$ in the positive electrolyte to $Fe^{2+}$. The reduction of $Fe^{3+}$ to $Fe^{2+}$ enables modification of the state of charge of the positive electrolyte; however, the protons ($H^+$) migrate into the positive electrolyte. This process results in the removal of protons ($H^+$) from the negative electrolyte (during hydrogen evolution) and release into the positive electrolyte (during rebalancing). A consequence of proton removal from the negative electrolyte ($H_2$ evolution) and insertion into the positive electrolyte ($H_2$ recombination) is the divergence of electrolyte pH from optimal operating values (the positive electrolyte becomes more acidic and the negative electrolyte becomes less acidic). Increasing the pH of the negative electrolyte can lead to the inability to completely oxidize plated iron to ferrous cations or the oxidation or loss of FeO from the cell either as an iron oxyhydroxide, iron oxide, or as iron flakes. This results in reduced capacity in the negative electrolyte and lead to precipitates/sediments being circulated in the electrolyte loop, which can lead to the formation of blockages over time. The direct introduction of $Fe^{3+}$ cations to the higher pH negative electrolyte can lead to the precipitation of iron oxyhydroxide or iron oxide byproducts which can lead to obstruction of electrolyte flow and battery failure.

Another failure mechanism experienced by RFBs is electrolyte crossover (either hydraulic crossover, the crossover of active species, or a combination of both) across the membrane which can be driven by the variation of species concentration during charge and discharge, electrolyte flow rate, pressure and osmotic pressure differences. Electrolyte properties, such as density, viscosity, and conductivity, change with the oxidation state of the active species. In the case of a hybrid RFB, such as an all-iron RFB, significant disparity in the concentration of iron ions in the electrolytes can lead to a severe difference in osmotic pressure in the positive electrolyte and negative electrolyte, which in turn can lead to the migration of electrolyte across the membrane, with $Fe^{3+}$ moving from the positive electrolyte to the negative electrolyte and $H_2O$ moving from the negative electrolyte to the positive electrolyte.

There are strategies to reduce electrolyte crossover, such as using different and varying flow rates or back pressures for each electrolytes to compensate for any pressure differential across the membrane, or by enhancing the selectivity of the separator to eliminate the crossover of active species, which is very challenging to achieve in practice. In the case of an all-iron RFB where the active species is the same in both electrolytes, the maximum system capacity can be restored by mixing and rebalancing the electrolyte so that each electrolyte tank has an equal number of active molecules.

As previously stated, IFBs operating with acidic electrolytes are known to have parasitic hydrogen evolution at the negative electrode. This becomes a problem because the electrolytes eventually end up with an unbalanced state of charge (SoC) due to electrons being consumed at the negative electrode by hydrogen evolution instead of $Fe^{2+}$ reducing to FeO. Additionally, protons are removed from the negative electrolyte, significantly raising the pH, which can lead to the precipitation of iron hydroxides. Ideally, charge balance in the electrolytes and pH would return to the original starting values at the end of every cycle assuming a symmetric charge and discharge protocol, with all REDOX activity only occurring at the active species. However, as described previously, parasitic side reactions can occur, e.g., H2 evolution or the precipitation of unwanted iron oxyhydroxide species, which can result in an imbalance in electrolyte properties including [Fe] in solution, [$H^+$], and electrolyte volume.

Ideally, IFBs are operated with the negative electrolyte solution in a very narrow pH window, such that it is as high as possible to limit the possibility to generate $H_2$ at the negative electrode and as low as possible to inhibit the unwanted formation of iron oxides and hydroxides. However, the pH profile throughout large IFB installations is not uniform, and it is conceivable that the pH immediately after leaving the stack may be higher than the bulk electrolyte, resulting in localized areas in the system prone to the formation of precipitates.

Precipitates that form and stay within battery stacks are typically dissolved back into the electrolyte through consecutive charge and discharge cycles. However, any that break free from the stacks or system manifolding can settle in the electrolyte storage tanks and become difficult to redissolve back into solution, be pumped back through the electrolyte loop potentially resulting in damage to process equipment and instruments, or cause blockages in the electrolyte piping or battery stacks. Additionally, formation of iron-based precipitates will decrease the concentration of active redox species in the RFB, decreasing the overall capacity of the electrolyte. This impact can worsen over time if precipitates settle to the bottom of tanks and are not redissolved in solution. In this way, precipitates and any other undesirable particulates suspended in the electrolytes can be detrimental to system mechanical reliability, electrochemical performance, and subsequent system efficiency.

Therefore, there is a need for a simple and effective method to remove unwanted particles from the electrolyte, and/or allow for precipitates containing active redox species to be dissolved back into solution.

DESCRIPTION OF THE INVENTION

Figure 1:
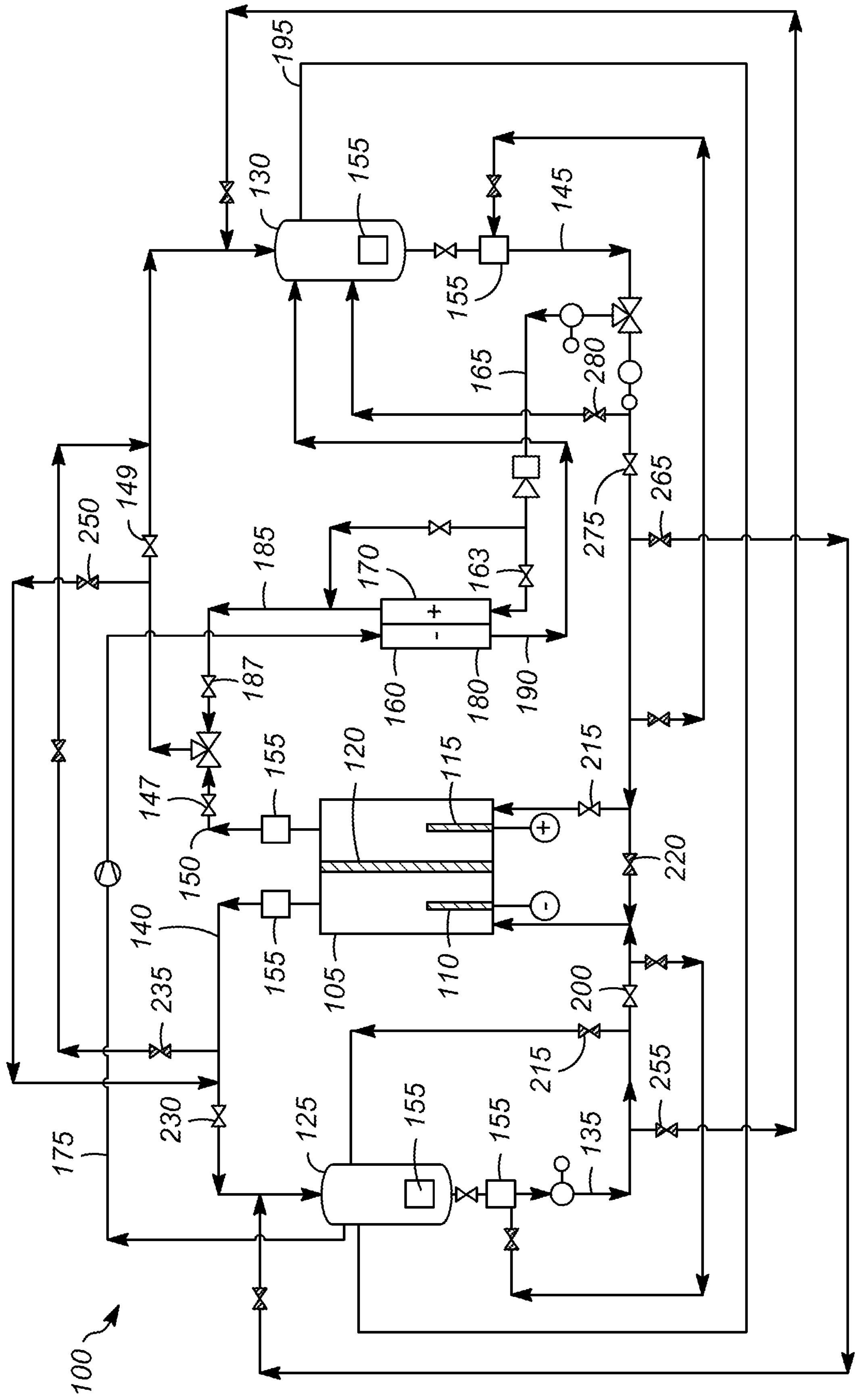
FIG. 1 is a process flow diagram of one embodiment of the normal operation of a redox flow battery with an optional rebalancing system.

This utilizes fluid filtration systems to capture and/or redissolve any precipitate that may form or otherwise be present in the electrolyte loops in redox flow battery systems.

Redox flow batteries are particularly attractive energy storage solutions for extremely large-scale energy project owing to their ability to deliver thousands of cycles at greater than 4 hr discharge duration. As the size of RFB installations increase to facilitate MWh and GWh delivery, engineering solutions need to be employed to ensure all aspects of the installation are protected against a variety of potential failure modes. Filtration of debris and precipitates within large scale redox flow battery installations helps protect key componentry, such as the pumps, sensory equipment, battery stacks, and rebalancing auxiliary systems.

In hybrid redox flow batteries, e.g., IFBs, it is desirable to take precautions to ensure that any plated material dislodged from the anode during cycling cannot freely circulate through the system. Otherwise, deposition of plated material in the storage tank or IFB piping may lead to loss of capacity and potentially to the formation of obstructions in the system, and ultimately to system failure. It is also desirable to take precautions to ensure that any precipitates that may form through abnormal system conditions, for example an unexpected increase in pH in one of the electrolytes through mechanical failure or the failure of a sensor, do not result in catastrophic system blockages.

The careful placement of filtration units in RFB systems, especially hybrid systems, helps to maintaining overall system health. Filters can be located immediately before or after individual stacks or strings of stacks, as well as before, after, or inside electrolyte storage tanks in order to minimize the occurrence of blockages within stacks or the introduction of solids to electrolyte tanks. Filters may also be positioned before or after system rebalancing components, such as systems to enable hydrogen recombination or systems to enable electrolyte tank rebalancing (if present). Owing to the autonomous nature of RFB installations, the application of filters should not result in a reduction in electrolyte capacity. In a system such as an iron flow battery, iron precipitates captured in a filter, such as FeO or $Fe_2O_3$, $Fe(OH)_3$, $Fe(OH)_2$ etc., are less stable at lower pH values and may redissolve back into the electrolyte during battery cycling. Alternatively, the accumulation of precipitates in the IFB system may require corrective action to be taken in order to ensure the system continues to operate at optimal efficiency.

Various types of RFB can be used. Suitable RFB include, but are not limited to, Fe/Sn, Fe/Ti, Fe/Cr, Fe/Fe, Fe/Zn, V/V, Zn/Br, and Zn/Ce.

The redox active species for the RFB depend on the type of RFB. The redox active species for a Fe/Sn RFB comprise $Fe^{2+}/Fe^{3+}$ and $Sn^0/Sn^{2+}$. The redox active species for a Fe/Ti RFB comprise $Fe^{2+}/Fe^{3+}$ and $Ti^{3+}/Ti^{4+}$. The redox active species for a Fe/Cr RFB comprise $Fe^{2+}/Fe^{3+}$ and $Cr^{2+}/Cr^{3+}$. The redox active species for a Fe/Fe RFB comprise $Fe^{2+}/Fe^{3+}$ and $Fe^{2+}/Fe^0$. The redox active species for a Fe/Zn RFB comprise $Fe^{2+}/Fe^{3+}$ and $Zn^0/Zn^{2+}$. The redox active species for a V/V RFB comprise $VO_2+/VO^{2+}$ and $V^{2+}/V^{3+}$. The redox active species for a Zn/Br RFB comprise $Br_2/Br$ and $Zn^0/Zn^{2+}$. The redox active species for a Zn/Ce RFB comprise $Ce^{3+}/Ce^{4+}$ and $Zn^{2+}/Zn^0$.

In some embodiments, the redox active species in the negative electrolyte comprises Fe, or the redox active species in the positive electrolyte comprises Fe, or both.

In some embodiments, the redox active species in the negative electrolyte is plated on the negative electrode.

In some embodiments, the process further comprises a first rebalancing system in fluid communication with the negative electrolyte, or a second rebalancing system in fluid communication with the positive electrolyte, or both. There can optionally be an additional filter upstream or downstream or both of the first rebalancing system; or an additional filter upstream or downstream or both of the second rebalancing system; or both.

In some embodiments, the process further comprises cleaning the at least one filter after filtering the negative electrolyte, or the positive electrolyte, or both in the at least one filter. Methods of cleaning the filters are well known to those of skill in the art. Suitable cleaning methods include, but are not limited to, backflushing, replacement of filter elements, removal of mesh filters for cleaning and replacement, or combinations thereof.

There are a number of operating methods to ensure that precipitates in a RFB are captured and/or redissolved back into solution to maintain electrolyte capacity.

FIG. 1 depicts normal RFB operation during charge and discharge. Filters may be placed before or after battery stacks, or before, after, or in electrolyte tanks to prevent circulation of precipitates in solution.

One aspect of the invention is a process for limiting circulation of precipitates in a redox flow battery system. In one embodiment, the process comprises providing at least one rechargeable cell comprising a negative electrode, a positive electrode, and a separator positioned between the negative electrode and the positive electrode, a negative electrolyte and a negative electrolyte tank, the negative electrolyte in contact with a negative electrode, and a positive electrolyte and a positive electrolyte tank, the positive electrolyte in contact with a positive electrode. A flow of the negative electrolyte is circulated in a negative electrolyte loop comprising a first negative electrolyte stream from the negative electrolyte tank to the negative electrode and a second negative electrolyte stream from the negative electrode to the negative electrolyte tank. A flow of the positive electrolyte is circulated in a positive electrolyte loop comprising a first positive electrolyte stream from the positive electrolyte tank to the positive electrode and a second positive electrolyte stream from the positive electrode to the positive electrolyte tank. The negative electrolyte, or the positive electrolyte, or both is filtered in at least one filter.

In some embodiments, there is at least one filter in the negative electrolyte loop.

There can be one or more filter(s) in the negative electrolyte loop, one or more filter(s) in the positive electrolyte loop, or one or more filter(s) in both the negative electrolyte loop and the positive electrolyte loop. There can be one or more filter(s) in the negative electrolyte tank, and/or one or more filter(s) on the first negative electrolyte stream, and/or one or more filter(s) on the second negative electrolyte stream. There can be one or more filter(s) in the positive electrolyte tank, and/or one or more filter(s) on the first positive electrolyte stream, and/or a filter on the second positive electrolyte stream. There can be one or more filter(s) at the locations described in the negative electrolyte loop, or one or more filter(s) at the locations described in the positive electrolyte loop, or one or more filter(s) at the locations described in both the negative and the positive electrolyte loops.

Suitable filters include, but are not limited to, filters with candle or pleated filter elements, clean-in-place or backflush filters, bag filters, membrane filters, and/or fine mesh baskets, or combinations thereof.

When the electrolyte (negative and/or positive) in the RFB system needs to be refreshed, there are a number of ways this can be done.

Figure 2:
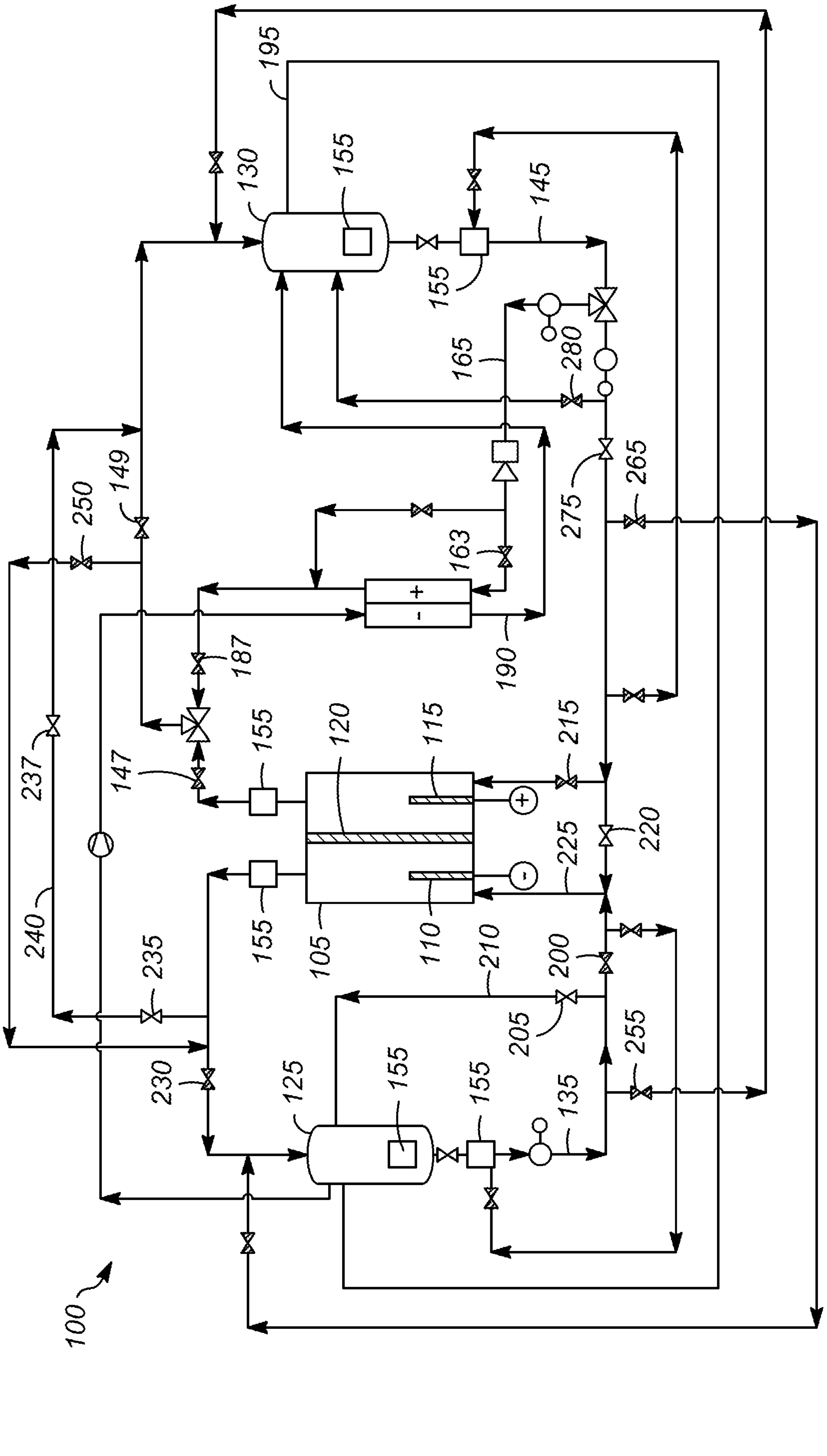
FIG. 2 is a process flow diagram of one embodiment of a refresh process for a redox flow battery.

FIG. 2 depicts RFB operation in a refresh procedure, where positive electrolyte flows over the negative electrode and back to the positive electrolyte tank. In this configuration, the more acidic positive electrolyte can more effectively dissolve precipitates in a filter downstream of the negative electrode, as well as any precipitates that may be held up in the negative electrode cell. Negative electrolyte can be circulated from the negative electrolyte tank, through a filter, back to the tank to continue to capture any precipitates in the negative electrolyte stream.

In some embodiments, this is accomplished by redirecting the flow of the negative and positive electrolyte.

In one embodiment, the flow of the negative electrolyte in the negative electrolyte loop is interrupted by redirecting the first negative electrolyte stream to form a second negative electrolyte loop. The second negative electrolyte loop comprises a third negative electrolyte stream from the negative electrolyte tank returning directly back to the negative electrolyte tank. The flow of the positive electrolyte in the positive electrolyte loop is interrupted by redirecting the first positive electrolyte stream to form a second positive electrolyte loop. The second positive electrolyte loop comprises a third positive electrolyte stream from the positive electrolyte tank to the negative electrode and from the negative electrode to the positive electrolyte tank. After the refresh is completed, the third positive electrolyte stream is redirected to the positive electrode, and the positive electrolyte loop is reformed. The third negative electrolyte stream is redirected to the negative electrode, and the first negative electrolyte loop is reformed.

Figure 3:
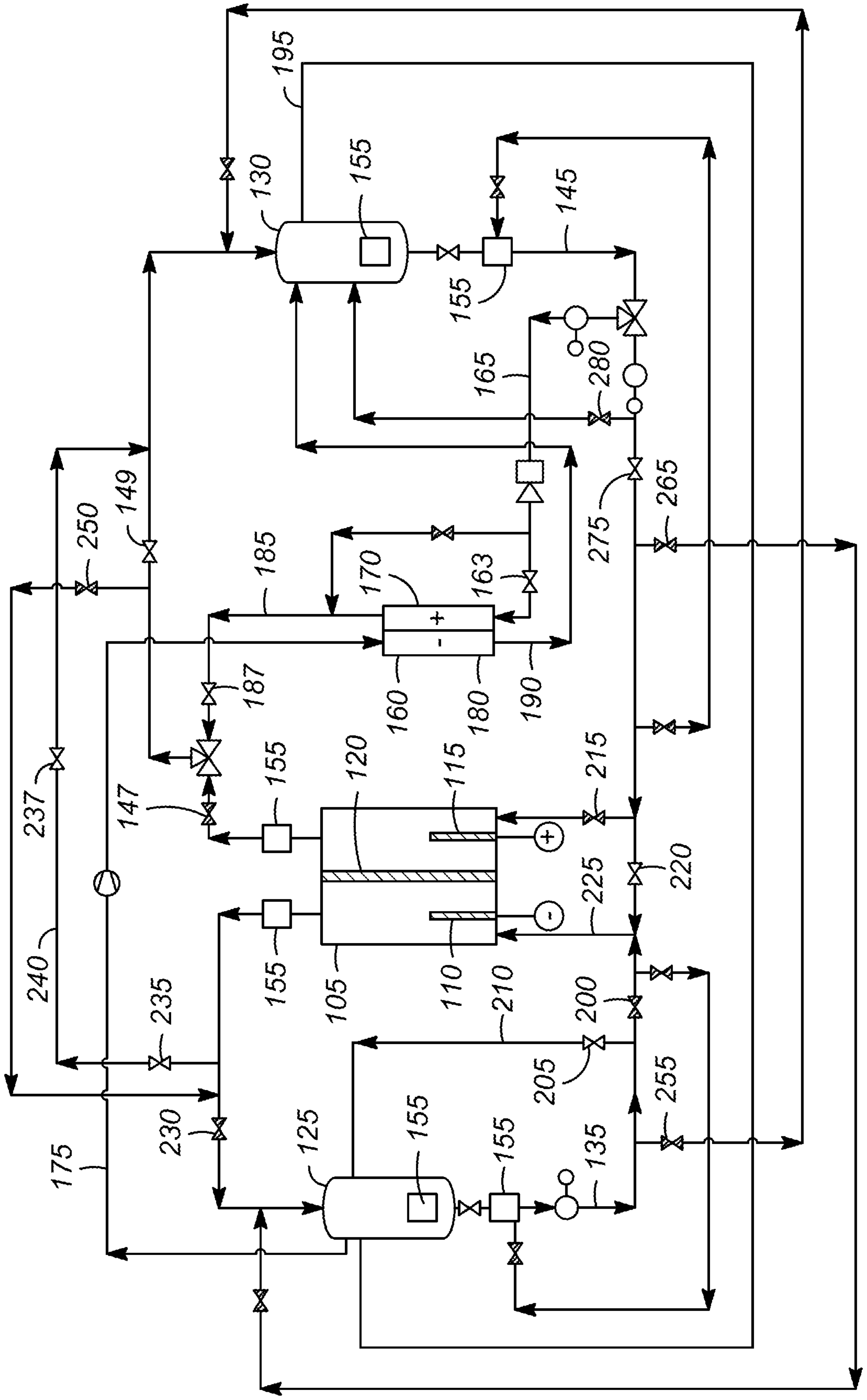
FIG. 3 is a process flow diagram of the embodiment of the refresh process of FIG. 2 with a rebalancing system.

FIG. 3 depicts RFB operation in a refresh procedure, where positive electrolyte flows over the negative electrode and back to the positive electrolyte tank, and positive electrolyte also flows through an electrolyte rebalancing system and back to the positive electrolyte tank as shown in FIG. 2. The rebalancing system further acidifies the positive electrolyte, for example by putting hydrogen gas back into solution as H+ protons. In one embodiment, a portion of the third positive electrolyte stream and hydrogen gas are passed to the rebalancing system to form a treated stream, and the treated stream is passed to the positive electrolyte tank.

Figure 4:
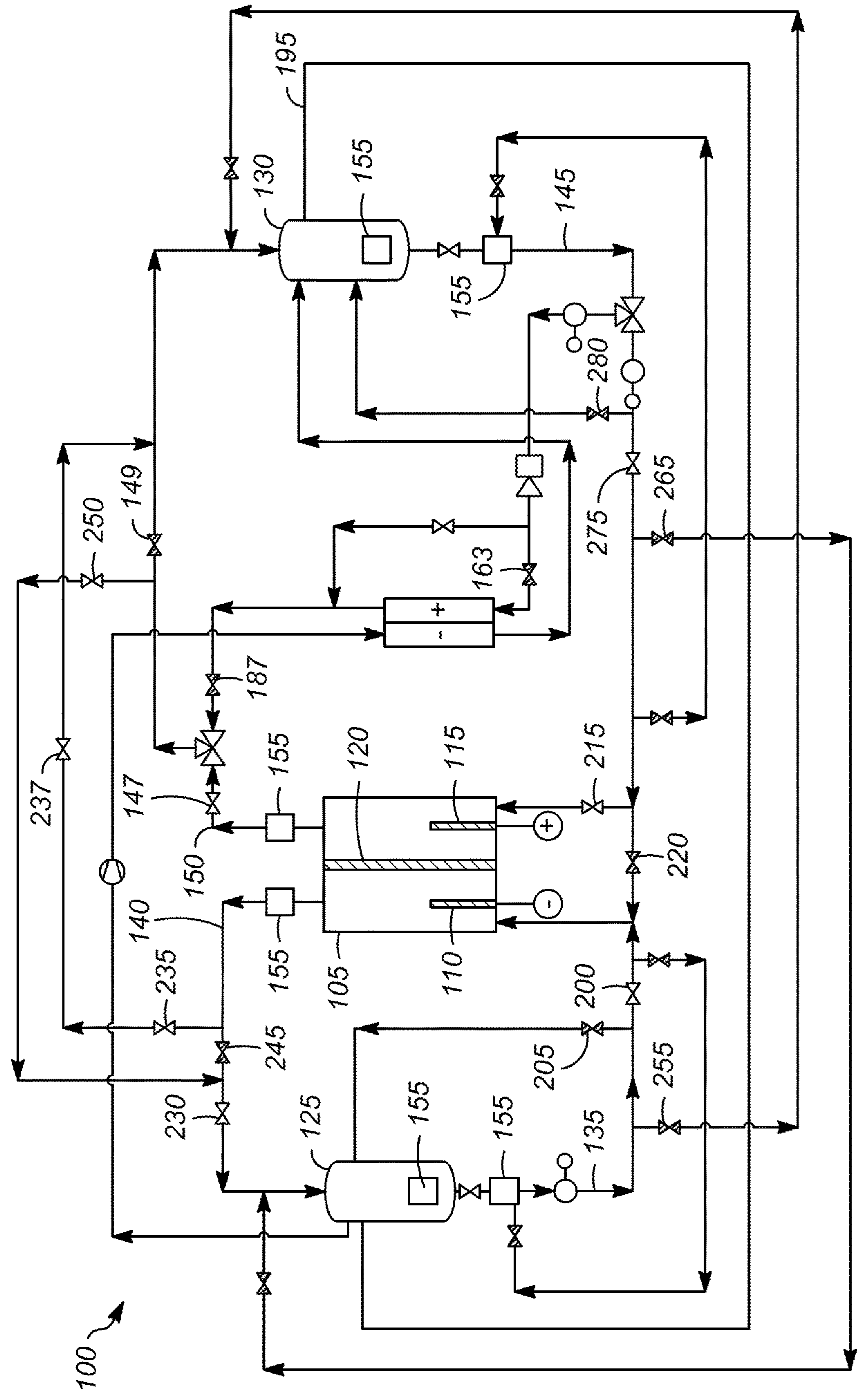
FIG. 4 is a process flow diagram of another embodiment of a refresh process for a redox flow battery.

FIG. 4 depicts RFB operation in a refresh procedure where the negative and positive electrolytes are fully mixed together. This function enables the negative electrolyte, which has a higher pH and is more prone to precipitate formation, to mix with the more acidic positive electrolyte, which can dissolve precipitates in solution. This also allows for more acidic electrolyte to flow through the filter(s) in the negative electrolyte loop and dissolve precipitates that have been captured.

In one embodiment, the negative electrolyte loop is interrupted by redirecting the second negative electrolyte stream to the positive electrolyte tank and interrupting the positive electrolyte loop by redirecting the second positive electrolyte stream to the negative electrolyte tank. After the refresh, the second negative electrolyte stream is redirected to the negative electrolyte tank, and the negative electrolyte loop is reformed. The second positive electrolyte stream is redirected to the positive electrolyte tank, and the positive electrolyte loop is reformed.

Figure 5:
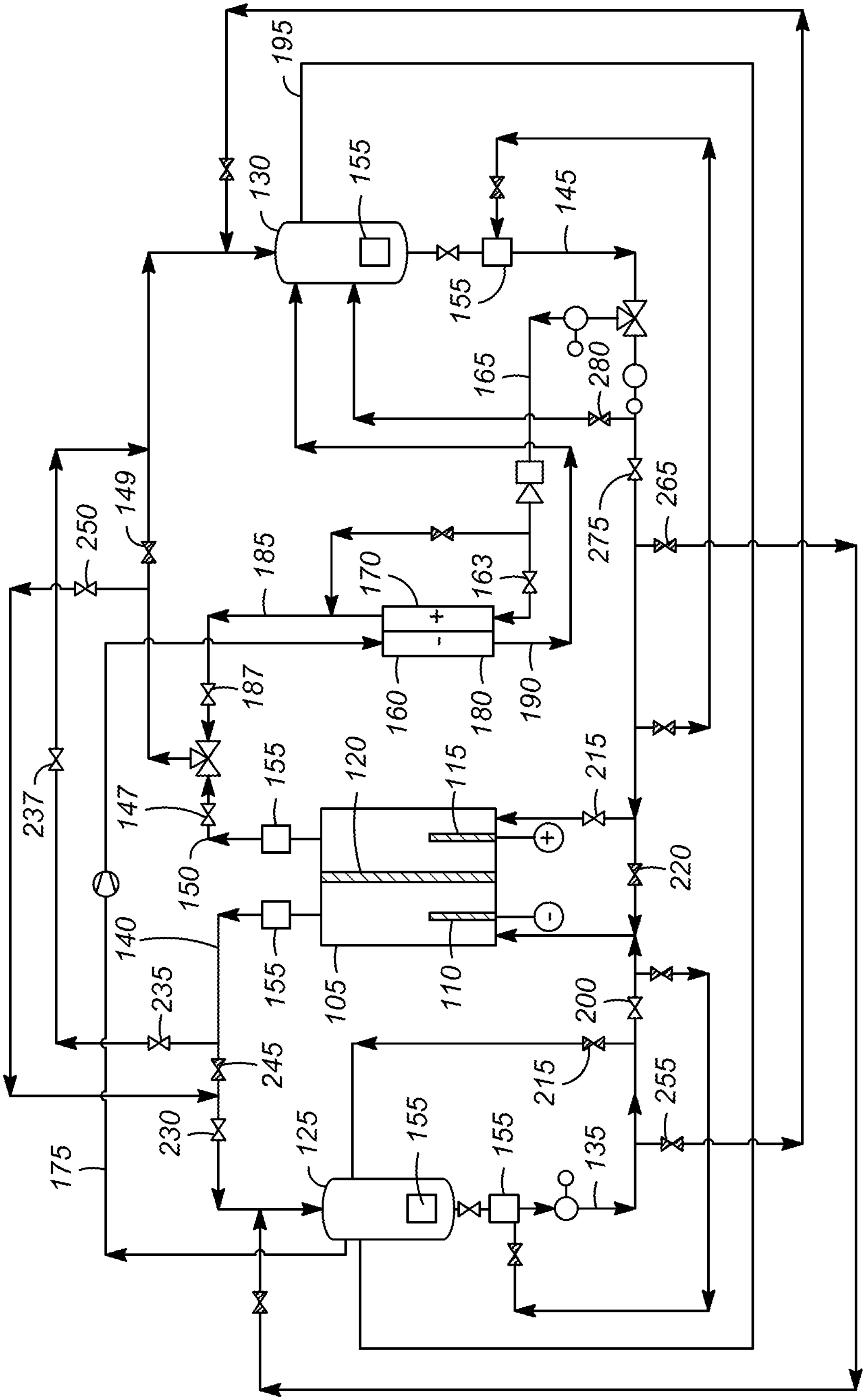
FIG. 5 is a process flow diagram of the embodiment of the refresh process of FIG. 4 with a rebalancing system.

FIG. 5 depicts RFB operation in a refresh procedure where the negative and positive electrolytes are fully mixed together, as shown in FIG. 4, and mixed electrolyte also flows through an electrolyte rebalancing system and back to the positive electrolyte tank. In one embodiment, a portion of the first positive electrolyte stream and hydrogen gas are passed to a rebalancing system to form a treated stream; and the treated stream is passed to the negative electrolyte tank.

Figure 6:
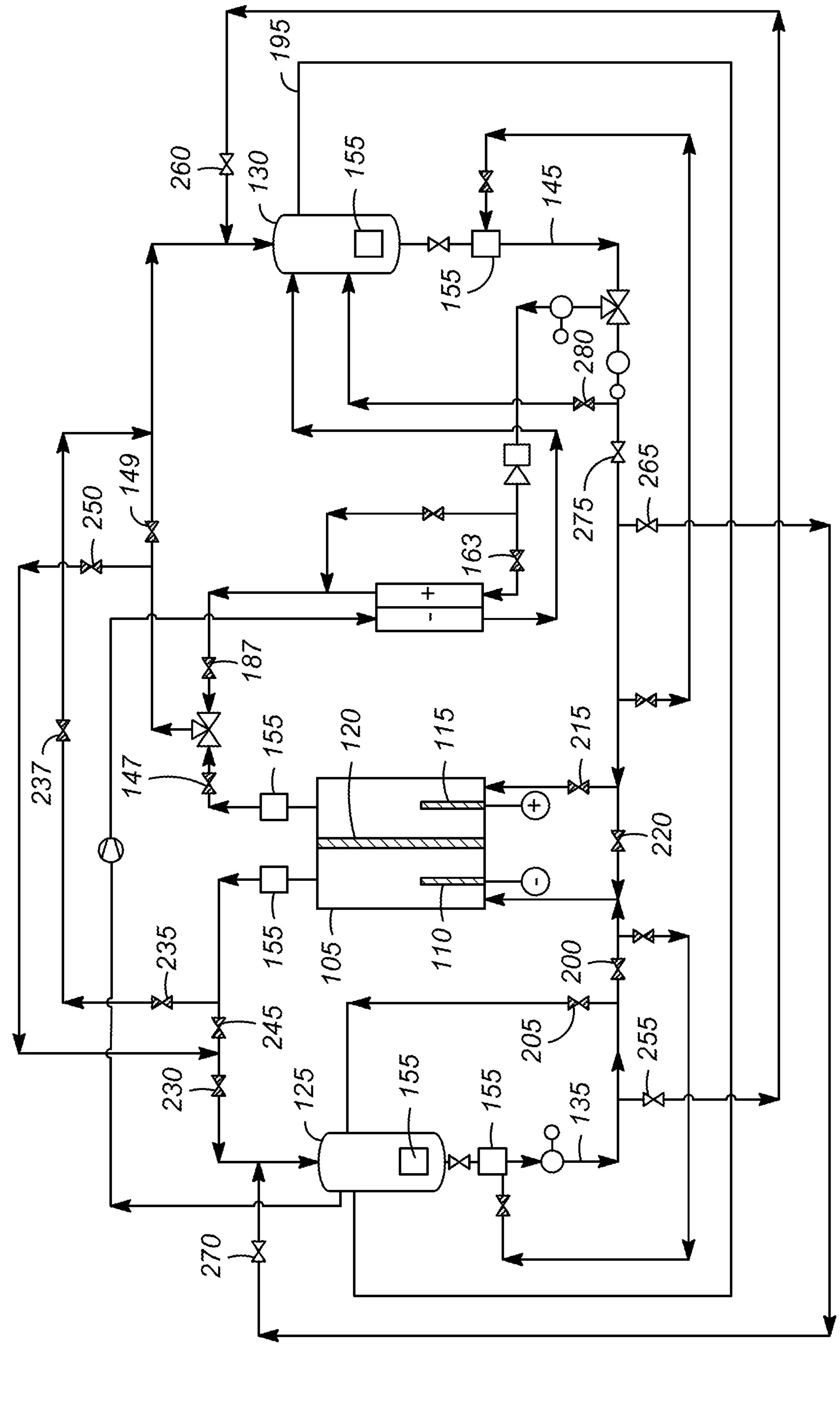
FIG. 6 is a process flow diagram of another embodiment of a refresh process for a redox flow battery.

FIG. 6 depicts RFB operation in a refresh procedure where the negative and positive electrolytes bypass all battery stacks and are fully mixed together.

In one embodiment, the negative electrolyte loop is interrupted by redirecting the first negative electrolyte stream to the positive electrolyte tank and interrupting the positive electrolyte loop by redirecting the first positive electrolyte stream to the negative electrolyte tank. After the refresh, the first negative electrolyte stream is redirected to the negative electrolyte tank, and the negative electrolyte loop is reformed. The first positive electrolyte stream is redirected to the positive electrolyte tank, and the positive electrolyte loop is reformed.

Figure 7:
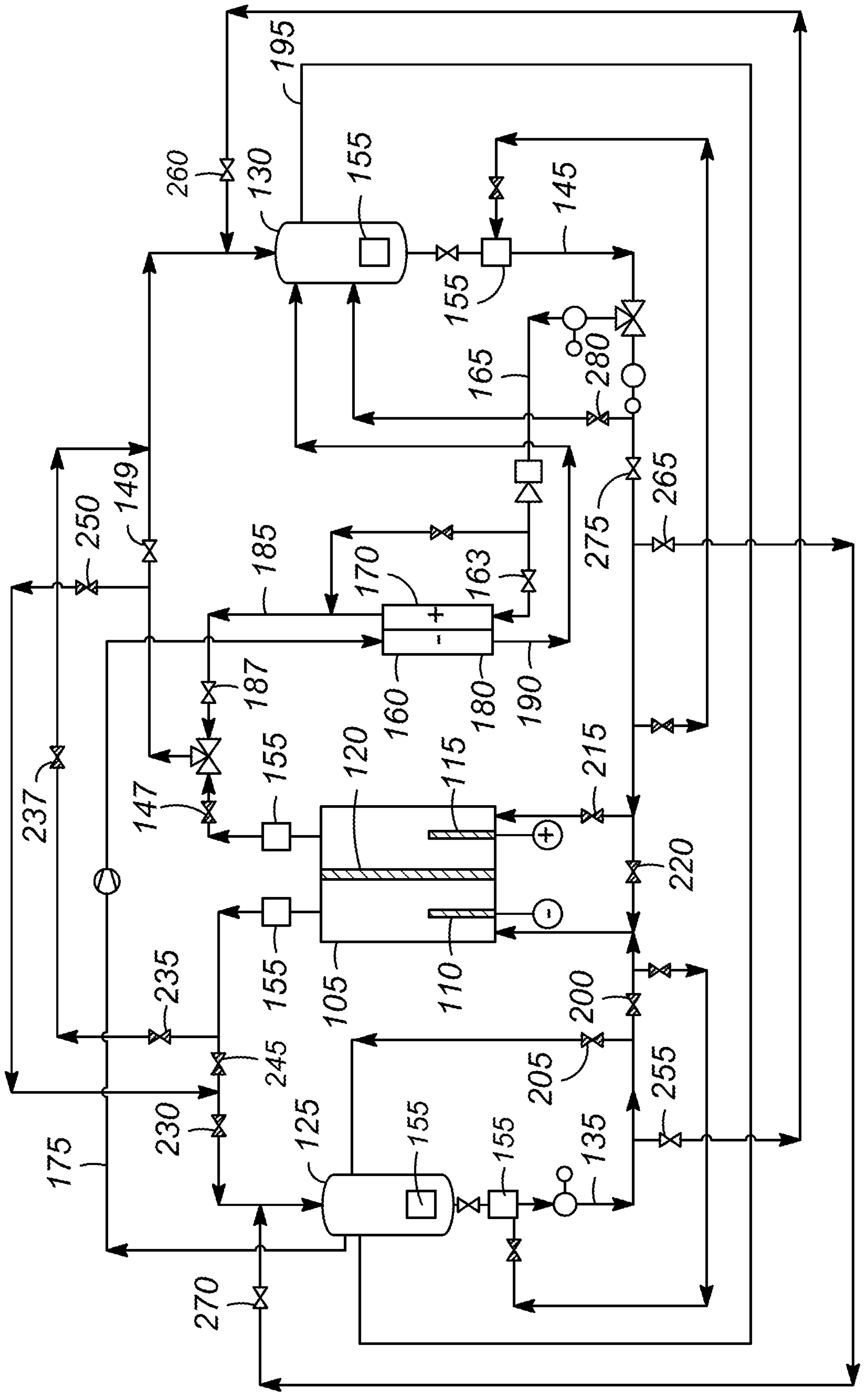
FIG. 7 is a process flow diagram of the embodiment of the refresh process of FIG. 6 with a rebalancing system.

FIG. 7 depicts RFB operation in a refresh procedure where the negative and positive electrolytes bypass all battery stacks and are fully mixed together, and mixed electrolyte also flows through an electrolyte rebalancing system and back to the positive electrolyte tank. In one embodiment, a portion of the first positive electrolyte stream and hydrogen gas are passed to a rebalancing system to form a treated stream, and the treated stream is passed to the positive electrolyte tank.

Figure 8:
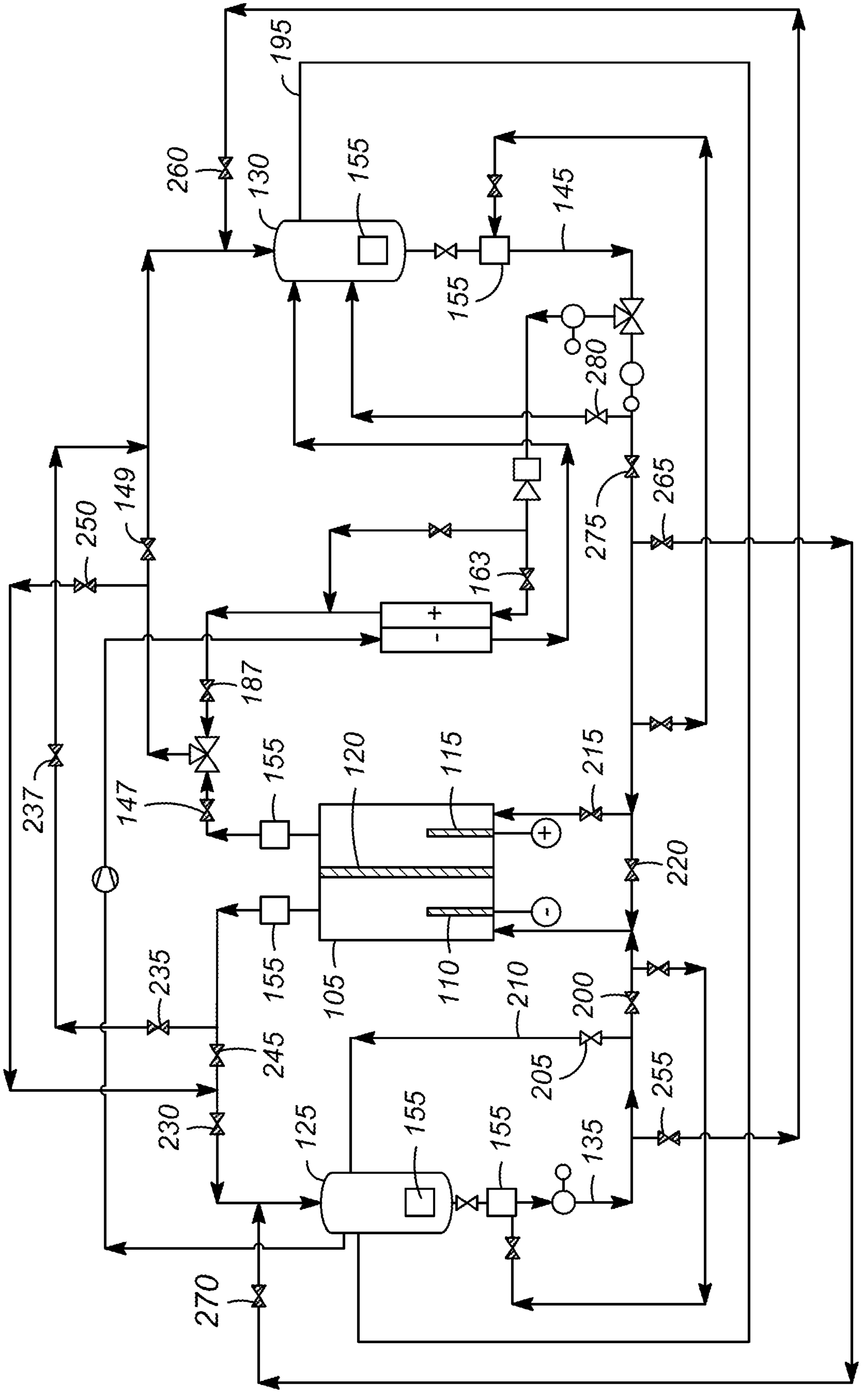
FIG. 8 is a process flow diagram of another embodiment of a refresh process for a redox flow battery.

FIG. 8 depicts RFB operation in a non-routine refresh procedure where each electrolyte is circulated through filters and back to its respective tank. The purpose would be to capture precipitates in either solution and prevent their circulation through battery stacks.

In one embodiment, the negative electrolyte loop is interrupted by redirecting the first negative electrolyte stream to form a second negative electrolyte loop comprising a third negative electrolyte stream from the negative electrolyte tank returning directly back to the negative electrolyte tank. The positive electrolyte loop is interrupted by redirecting the first positive electrolyte stream to form a second positive electrolyte loop comprising a third positive electrolyte stream from the positive electrolyte tank returning directly back to the positive electrolyte tank. After the refresh, the first negative electrolyte stream is redirected to the negative electrolyte tank, and the negative electrolyte loop is reformed. The first positive electrolyte stream is redirected to the positive electrolyte tank, and the positive electrolyte loop is reformed.

Figure 9:
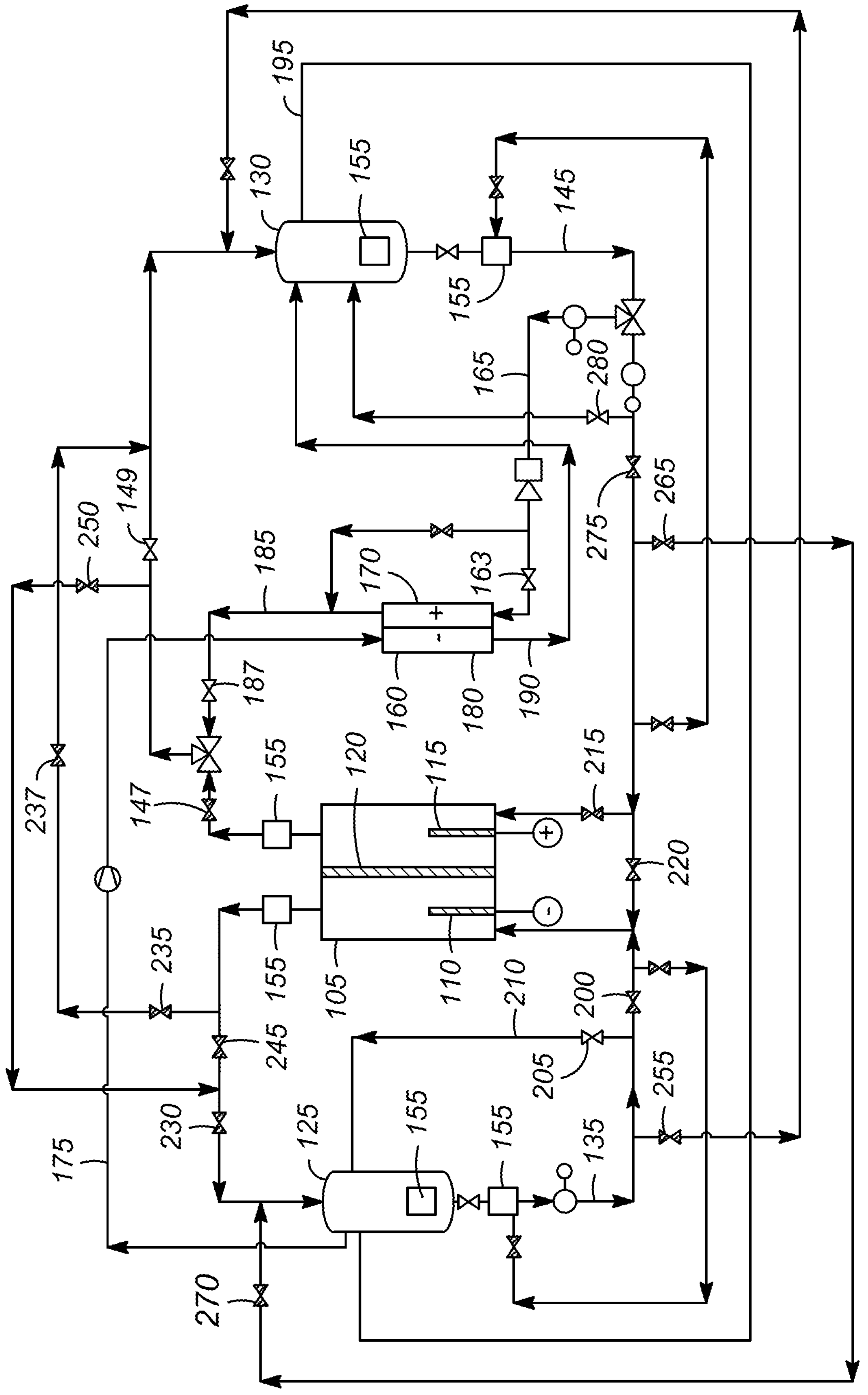
FIG. 9 is a process flow diagram of the embodiment of the refresh process of FIG. 8 with a rebalancing system.

FIG. 9 depicts RFB operation in a non-routine refresh procedure where each electrolyte is circulated through filters and back to its respective tank. The positive electrolyte is also sent to a rebalancing system to further acidify the stream. The purpose would be to capture precipitates in either solution and prevent their circulation through battery stacks. In one embodiment, a portion of the third positive electrolyte stream and hydrogen gas are passed to a rebalancing system to form a treated stream, and the treated stream is passed to the positive electrolyte tank.

Figure 10:
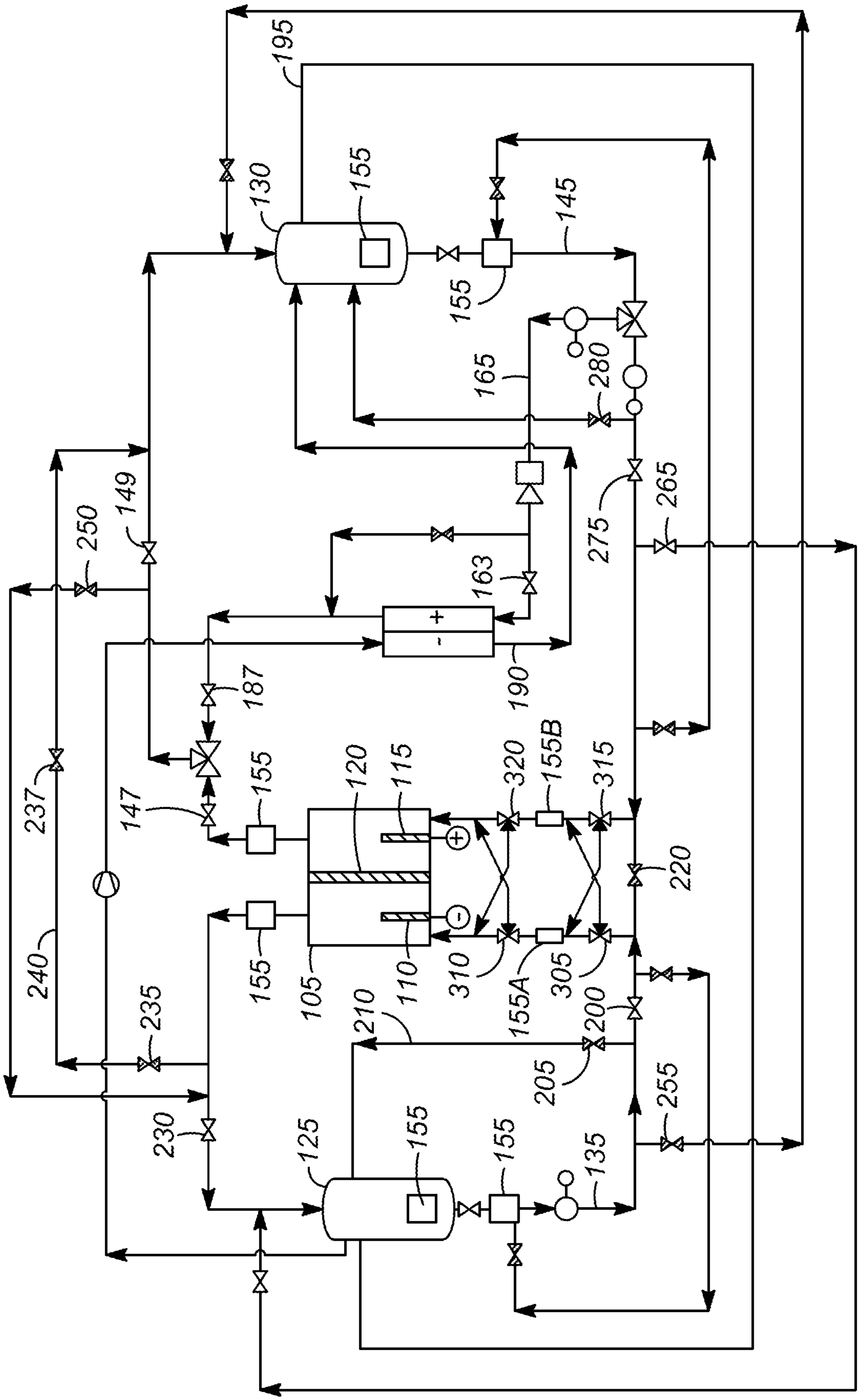
FIG. 10 is a process flow diagram of another embodiment of a process for a redox flow battery in normal operation.

FIG. 10 shows a RFB operation in normal operation where the negative and positive electrolyte circulate through negative and positive filters positioned before the battery cell, through the battery cell, and back to the negative and positive electrolyte tanks.

Figure 11:
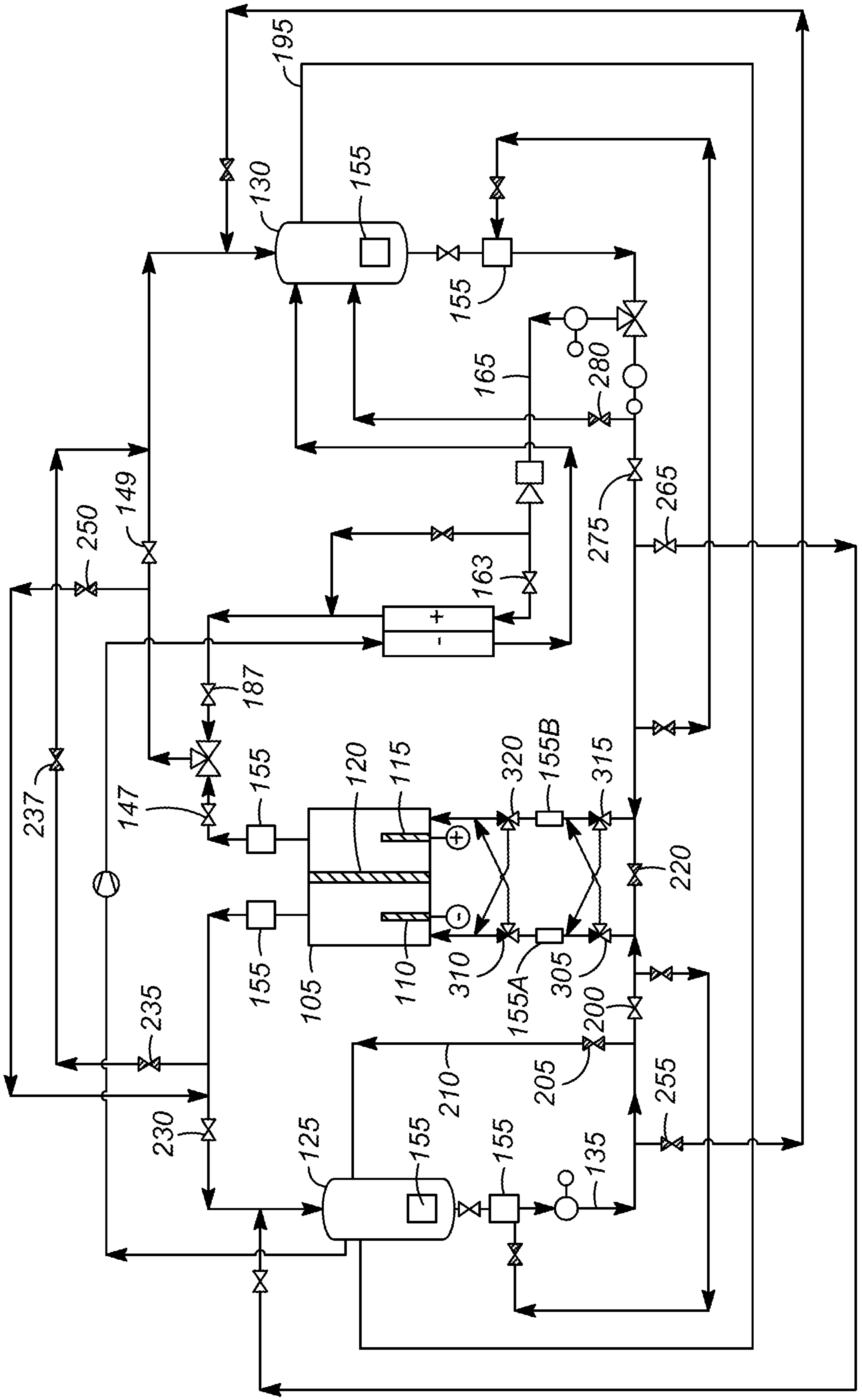
FIG. 11 is a process flow diagram for a refresh process for the embodiment of FIG. 10.

FIG. 11 shows RFB operation during a non-routine refresh procedure where the negative electrolyte flows through the positive filter and the negative electrode and back to the negative electrolyte tank, and the positive electrolyte flows through the negative filter and the positive electrode and back to the positive electrolyte tank. This allows the filters to change back and forth between the negative electrolyte which is more likely to contain precipitates, and the positive electrolyte which is more likely to dissolve precipitates because of the difference in pH between the two.

Another aspect of the invention is a process for limiting circulation of precipitates in a redox flow battery system. In one embodiment, the process comprises: providing at least one rechargeable cell comprising a negative electrode, a positive electrode, and a separator positioned between the negative electrode and the positive electrode, a negative electrolyte and a negative electrolyte tank, the negative electrolyte in contact with a negative electrode, and a positive electrolyte and a positive electrolyte tank, the positive electrolyte in contact with a positive electrode, wherein a redox active species in the negative electrolyte comprises Fe, or wherein a redox active species in the positive electrolyte comprises Fe, or both. A flow of the negative electrolyte is circulated in a negative electrolyte loop comprising a first negative electrolyte stream from the negative electrolyte tank to the negative electrode and a second negative electrolyte stream from the negative electrode to the negative electrolyte tank. A flow of the positive electrolyte is circulated in a positive electrolyte loop comprising a first positive electrolyte stream from the positive electrolyte tank to the positive electrode and a second positive electrolyte stream from the positive electrode to the positive electrolyte tank. The negative electrolyte, or the positive electrolyte, or both is filtered in at least one filter. The at least one filter comprises a filter in the negative electrolyte loop, or a filter in the positive electrolyte loop, or both.

In some embodiments, there are one or more of: a filter in the negative electrolyte tank, a filter on the first negative electrolyte stream, or a filter on the second negative electrolyte stream; or one or more of a filter in the positive electrolyte tank, a filter on the first positive electrolyte stream, or a filter on the second positive electrolyte stream; or both.

In some embodiments, the process further comprises: a first rebalancing system in fluid communication with the negative electrolyte, or a second rebalancing system in fluid communication with the positive electrolyte, or both; and optionally, an additional filter upstream or downstream or both of the first rebalancing system; or an additional filter upstream or downstream or both of the second rebalancing system; or both.

In some embodiment, the process further comprises cleaning the at least one filter after filtering the negative electrolyte, or the positive electrolyte, or both in the at least one filter.

The RFB system can include a control system for controlling the operation of the RFB and the refresh of the electrolyte. Control systems are known to those of skill in the art. Any suitable control system can be used. In some embodiments, the control system can include a sensor in electronic communication with a controller. One or more properties could be used to control the flow(s) of electrolyte, including but not limited to dP, pH, flow rate, pump current draw, turbidity, color, viscosity, resistance, voltage, current, or combinations thereof. An appropriate sensor would be selected based on the property to be used in controlling the electrolyte flow, as is known in the art (e.g., sensors for measuring properties including, but not limit to, dP, pH, flow rate, turbidity, color, viscosity, or combinations thereof). Each property (or combination of properties) would have a predetermined operating range to which the controller would respond by opening or closing the appropriate valves allowing a redirection and/or subsequent reversal of flow through the filter device. For example, the sensor could be a dP meter to measure the dP of the electrolyte stream across the filter in normal operation. The measured dP can be sent to the controller, which will enact the appropriate system response to initiate a backflush or refresh procedure based on the measured dP and predetermined upper and lower filter dP limits.

In some embodiments, the system employs a control feedback loop based on a plurality of system inputs including but not limited to, pressure drop (dP), SoC, pH, pump motor current draw, turbidity, electrolyte color, resistance, voltage, current, viscosity, density, conductivity, and/or electrolyte flow rate, to trigger a backflush or change in electrolyte feed to the filter with a more acidic electrolyte (either catholyte or reset anolyte) to regain any lost electrolyte capacity and clear the filter of particulate matter.

In some embodiments, the device further comprises: a rebalancing system, such as a hydrogen recombination unit in fluid communication with either electrolyte loop for generating hydrogen ions.

In some embodiments, the positive electrolyte continuously flows to the positive chamber.

In some embodiments, the controller is a control valve.

In some embodiments, the device further comprises a sensor in electronic communication with the controller, the sensor in the primary negative electrolyte loop.

In some embodiments, the measured property comprises pH, gas pressure, flow rate, turbidity, viscosity, resistance, voltage, current, or combinations thereof.

In some embodiments, the measured property is pH, wherein the controller is a control valve, and further comprising a sensor in electronic communication with the controller, wherein the sensor is a pH meter, and wherein the sensor in the primary negative electrolyte loop.

The process can be operated at any appropriate operating condition. Standard operating conditions include, but are not limited to, operating within a temperature window of −25° C.-60° C. The power output from redox flow battery stacks can range from 250 W to 100 kW, typically from 1 kW to 75 kW and more typically still from 5 kW to 50 kW, with systems typically being able to deliver targeted power typically, but not exclusively between 2-24 hrs. The concentration of redox active species in the electrolyte can range from 0.1M to 7M, typically from 0.5M to 5M and more typically still from 1M to 3.5M. The electrolyte passes through the stack typically at a flow rate of 0.05-50 ml min-1 cm-2, typically at 0.1-25 ml min-1 cm-2 and more typically still from 0.25-5 ml min-1 cm-2.

FIG. 1 illustrates one embodiment of an RFB process flow diagram for an RFB system 100.

The RFB system 100 includes a rechargeable cell 105 comprising a negative electrode 110, a positive electrode 115, and a separator 120. There is a negative electrolyte tank 125 and a positive electrolyte tank 130.

The negative electrolyte is circulated in a negative electrolyte loop from the negative electrolyte tank 125 to the negative electrode 110 in the cell 105 and back to the negative electrolyte tank 125. Valves 200 and 230 are open, and valves 215, 220, 235, and 255 are closed. First negative electrolyte stream 135 flows from the negative electrolyte tank 125 to the negative electrode 110 in the cell 105 where the negative electrolyte contacts the negative electrode 110. Second negative electrolyte stream 140 flows from the negative electrode 110 in the cell 105 back to the negative electrode tank 125.

The positive electrolyte is circulated in a positive electrolyte loop from the positive electrolyte tank 130 to the cell 105 and back to the positive electrolyte tank 130. Valves 275 and 215 are open and valve 280 is closed. First positive electrolyte stream 145 flows from the positive electrolyte tank 130 to the positive electrode 115 in the cell 105 where the positive electrolyte contacts the positive electrode 115. Valves 147 and 149 are open, and valves 250 and 265 are closed, allowing second positive electrolyte stream 150 to flow from the positive electrode 115 in the cell 105 back to the positive electrolyte tank 130.

There is at least one filter 155 in the negative electrolyte loop, or the positive electrolyte loop, or both. There can be one or more filters in the negative electrolyte loop, or one or more filters in the positive electrolyte loop, or there can be one or more filters in both loops. The filter(s) 155 can be in the negative electrolyte tank 125, on the first negative electrolyte stream 135 between the negative electrolyte tank 125 and the negative electrode 110 in the cell 105, or on the second negative electrolyte stream 140 between the negative electrode 110 in the cell 105 and the negative electrolyte tank 125. The filter(s) 155 can be in the positive electrolyte tank 130, on the first positive electrolyte stream 145 between the positive electrolyte tank 130 and the positive electrode 115 in the cell 105, or between on the second positive electrolyte stream 150 between the positive electrode 115 in the cell 105 and the positive electrolyte tank 130.

In some embodiments, the RFB system 100 includes a hydrogen recombination system 160. Valve 163 is open, allowing a portion 165 of the first positive electrolyte stream 145 to flow to the cathode side 170 of the hydrogen recombination system 160. Hydrogen stream 175 from the negative electrolyte tank 125 is sent to the negative side 180. The hydrogen reduces the redox active species in the positive electrolyte. Valve 187 is open, allowing to the treated stream 185 to be combined with stream second positive 150 from the positive electrode 115 of the cell 105 and returned to the positive electrolyte tank 130.

The unused hydrogen stream 190 from the hydrogen recombination system 160 is sent to the positive electrolyte tank 130. Stream 195 extends between the positive electrolyte tank 130 and the negative electrolyte tank 125 to join the tank headspaces and equalize their pressures.

FIG. 2 illustrates one embodiment of a refresh process flow diagram for the RFB system 100.

In this situation, the normal operation of the RFB system 100 is interrupted by redirecting the first negative electrolyte stream 135. Valve 200 is shut, preventing the negative electrolyte from flowing to the negative electrode 110 of the cell 105. Valve 205 is open so that the third negative electrolyte stream 210 flows back to the negative electrolyte tank 125.

Valve 215 is closed, preventing the first positive electrolyte stream 145 from flowing to the positive electrode 115. Valve 220 is open, and third positive electrolyte stream 225 is sent to contact the negative electrode 110 in the cell 105. Valve 230 is closed, and valves 235 and 237 are open, allowing fourth positive electrolyte stream 240 to flow back to the positive electrolyte tank 130.

In the embodiment shown in FIG. 3, the RFB system 100 includes the hydrogen recombination system 160. Valve 163 is open, allowing a portion 165 of the first positive electrolyte stream 145 to flow to the cathode side 170 of the hydrogen recombination system 160. Hydrogen stream 175 from the negative electrolyte tank 125 is sent to the negative side 180. The hydrogen reduces the redox active species in the positive electrolyte. Valve 147 is closed, and valve 187 is open, allowing to the treated stream 185 to be returned to the positive electrolyte tank 130.

The unused hydrogen stream 190 is sent to the positive electrolyte tank 130. Stream 195 extends between the positive electrolyte tank 130 and the negative electrolyte tank 125 to join the tank headspaces and equalize their pressures.

FIG. 4 illustrates another embodiment of a refresh process for the RFB system 100. In this case, valve 200 is open and valves 205 and 220 are closed. The first negative electrolyte stream 135 flows from the negative electrolyte tank 125 to the negative electrode 110 of the cell 105. Valve 245 is closed, and valves 235 and 237 are open, allowing second negative electrolyte stream 140 to be sent to the positive electrolyte tank 130.

Valves 275 and 215 are open, and valves 265 and 280 are closed. The first positive electrolyte stream 145 is sent to the positive electrode 115. Valve 149 is closed, preventing the second positive electrolyte stream 150 from returning to the positive electrolyte tank 130. Valves 147, 250, and 230 are open, allowing the second positive electrolyte stream 150 to flow to the negative electrolyte tank 125.

The embodiment of FIG. 5 includes the hydrogen recombination system 160. Valve 163 is open, allowing a portion 165 of the first positive electrolyte stream 145 to flow to the cathode side 170 of the hydrogen recombination system 160. Hydrogen stream 175 from the negative electrolyte tank 125 is sent to the negative side 180. The hydrogen reduces the redox active species in the positive electrolyte. Valves 147 and 187 are open, allowing to the treated stream 185 to be combined with second positive electrolyte stream 150 from the positive electrode 115 of the cell 105 and returned to the positive electrolyte tank 130.

FIG. 6 shows another embedment of a refresh process for the RFB system 100. Valves 200 and 205 are closed, and valves 255 and 260 are open, allowing first negative electrolyte stream 135 to flow to the positive electrolyte tank 130. Valves 215 and 280 are closed, and valves 275, 265, and 270 are open, allowing first positive electrolyte stream 145 to flow to the negative electrolyte tank 125.

In the embodiment of FIG. 7, the RFB system 100 includes the hydrogen recombination system 160. Valve 163 is open, allowing a portion 165 of the first positive electrolyte stream 145 to flow to the cathode side 170 of the hydrogen recombination system 160. Hydrogen stream 175 from the negative electrolyte tank 125 is sent to the negative side 180. The hydrogen reduces the redox active species in the positive electrolyte. Valves 147 and 250 are closed, and valves 187 and 149 are open, allowing to the treated stream 185 to be returned to the positive electrolyte tank 130.

FIG. 8 illustrates another embodiment of a refresh process flow diagram for the RFB system 100. In this situation, the normal operation of the RFB system 100 is interrupted by redirecting the first negative electrolyte stream 135. Valves 200 and 255 are closed, preventing the negative electrolyte from flowing to the negative electrode 110 of the cell 105. Valve 205 is open so that the third negative electrolyte stream 210 flows back to the negative electrolyte tank 125.

Valves 215 and 275 are closed preventing the first positive electrolyte stream 145 from flowing to the positive electrode 115. Valve 280 is open, and first positive electrolyte stream 145 is returned to the positive electrolyte tank 130.

In the embodiment of FIG. 9, the RFB system 100 includes the hydrogen recombination system 160. Valve 163 is open, allowing a portion 165 of the first positive electrolyte stream 145 to flow to the cathode side 170 of the hydrogen recombination system 160. Hydrogen stream 175 from the negative electrolyte tank 125 is sent to the negative side 180. The hydrogen reduces the redox active species in the positive electrolyte. Valves 147 and 250 are closed, and valves 187 and 149 are open, allowing to the treated stream 185 to be returned to the positive electrolyte tank 130.

In the embodiment of FIG. 10, there are two pairs of three-way valves 305, 310, 315, 320 which control the flow of the negative electrolyte and the positive electrolyte to the negative electrode 110 and the positive electrode 115 of the cell 105. In normal operation, valves 305 and 310 are set to allow the negative electrolyte to flow through filter 155A to the negative electrode 110, while preventing it from flowing to filter 155B and the positive electrode 115. Valves 315 and 320 are set to allow the positive electrolyte to flow through filter 155B to the positive electrode 115, and to prevent it from flowing to filter 155A and the negative electrode 110.

In FIG. 11 during the refresh process, valve 305 is set to send the negative electrolyte through filter 155B while preventing it from flowing to filter 155A. Valve 320 is set to send the negative electrolyte to the negative electrode 110, while preventing it from flowing to the positive electrode 115. Valve 315 is set to send the positive electrolyte through filter 155A while preventing it from flowing to filter 155B. Valve 310 is set to send the positive electrolyte to the positive electrode 115 while preventing it from flowing to the negative electrode.

The process shown in FIGS. 10-11 can be incorporated in any of the processes shown in FIGS. 1-9.

SPECIFIC EMBODIMENTS

While the following is described in conjunction with specific embodiments, it will be understood that this description is intended to illustrate and not limit the scope of the preceding description and the appended claims.

A first embodiment of the invention is a process for limiting circulation of precipitates in a redox flow battery system comprising providing at least one rechargeable cell comprising a negative electrode, a positive electrode, and a separator positioned between the negative electrode and the positive electrode, a negative electrolyte and a negative electrolyte tank, the negative electrolyte in contact with a negative electrode, and a positive electrolyte and a positive electrolyte tank, the positive electrolyte in contact with a positive electrode; circulating a flow of the negative electrolyte in a negative electrolyte loop, the negative loop comprising a first negative electrolyte stream from the negative electrolyte tank to the negative electrode and a second negative electrolyte stream from the negative electrode to the negative electrolyte tank, and circulating a flow of the positive electrolyte in a positive electrolyte loop, the positive electrolyte loop comprising a first positive electrolyte stream from the positive electrolyte tank to the positive electrode and a second positive electrolyte stream from the positive electrode to the positive electrolyte tank; and filtering the negative electrolyte, or the positive electrolyte, or both in at least one filter. An embodiment of the invention is one, any or all of prior embodiments in this paragraph up through the first embodiment in this paragraph wherein the at least one filter comprises a filter in the negative electrolyte loop, or a filter in the positive electrolyte loop, or both. An embodiment of the invention is one, any or all of prior embodiments in this paragraph up through the first embodiment in this paragraph wherein the filter in the negative electrolyte loop comprises one or more of a filter in the negative electrolyte tank, a filter on the first negative electrolyte stream, or a filter on the second negative electrolyte stream; or wherein the filter in the positive electrolyte loop comprises one or more of a filter in the positive electrolyte tank, a filter on the first positive electrolyte stream, or a filter on the second positive electrolyte stream; or both. An embodiment of the invention is one, any or all of prior embodiments in this paragraph up through the first embodiment in this paragraph wherein at least one filter comprises the filter in the negative electrolyte loop An embodiment of the invention is one, any or all of prior embodiments in this paragraph up through the first embodiment in this paragraph further comprising interrupting the flow of the negative electrolyte in the negative electrolyte loop by redirecting the first negative electrolyte stream to form a second negative electrolyte loop, the second negative electrolyte loop comprising a third negative electrolyte stream from the negative electrolyte tank returning directly back to the negative electrolyte tank; interrupting the flow of the positive electrolyte in the positive electrolyte loop by redirecting the first positive electrolyte stream to form a second positive electrolyte loop, the second positive electrolyte loop comprising a third positive electrolyte stream from the positive electrolyte tank to the negative electrode and from the negative electrode to the positive electrolyte tank; redirecting the third positive electrolyte stream to the positive electrode and reforming the positive electrolyte loop; and redirecting the third negative electrolyte stream to the negative electrode and reforming the first negative electrolyte loop. An embodiment of the invention is one, any or all of prior embodiments in this paragraph up through the first embodiment in this paragraph further comprising passing a portion of the third positive electrolyte stream and hydrogen gas to a rebalancing system to form a treated stream; and passing the treated stream to the positive electrolyte tank. An embodiment of the invention is one, any or all of prior embodiments in this paragraph up through the first embodiment in this paragraph further comprising interrupting the negative electrolyte loop by redirecting the second negative electrolyte stream to the positive electrolyte tank and interrupting the positive electrolyte loop by redirecting the second positive electrolyte stream to the negative electrolyte tank; and redirecting the second negative electrolyte stream to the negative electrolyte tank and reforming the negative electrolyte loop and redirecting the second positive electrolyte stream to the positive electrolyte tank and reforming the positive electrolyte loop. An embodiment of the invention is one, any or all of prior embodiments in this paragraph up through the first embodiment in this paragraph further comprising; passing a portion of the first positive electrolyte stream and hydrogen gas from the negative electrolyte tank to a rebalancing system to form a treated stream; and passing the treated stream to the negative electrolyte tank. An embodiment of the invention is one, any or all of prior embodiments in this paragraph up through the first embodiment in this paragraph further comprising interrupting the negative electrolyte loop by redirecting the first negative electrolyte stream to the positive electrolyte tank and interrupting the positive electrolyte loop by redirecting the first positive electrolyte stream to the negative electrolyte tank; and redirecting the first negative electrolyte stream to the negative electrolyte tank and reforming the negative electrolyte loop and redirecting the first positive electrolyte stream to the positive electrolyte tank and reforming the positive electrolyte loop. An embodiment of the invention is one, any or all of prior embodiments in this paragraph up through the first embodiment in this paragraph further comprising; passing a portion of the first positive electrolyte stream and hydrogen gas to a rebalancing system to form a treated stream; and passing the treated stream to the positive electrolyte tank. An embodiment of the invention is one, any or all of prior embodiments in this paragraph up through the first embodiment in this paragraph further comprising interrupting the negative electrolyte loop by redirecting the first negative electrolyte stream to form a second negative electrolyte loop, the second negative electrolyte loop comprising a third negative electrolyte stream from the negative electrolyte tank returning directly back to the negative electrolyte tank, and interrupting the positive electrolyte loop by redirecting the first positive electrolyte stream to form a second positive electrolyte loop, the second positive electrolyte loop comprising a third positive electrolyte stream from the positive electrolyte tank returning directly back to the positive electrolyte tank; and redirecting the first negative electrolyte stream to the negative electrolyte tank and reforming the negative electrolyte loop and redirecting the first positive electrolyte stream to the positive electrolyte tank and reforming the positive electrolyte loop. An embodiment of the invention is one, any or all of prior embodiments in this paragraph up through the first embodiment in this paragraph further comprising; passing a portion of the third positive electrolyte stream and hydrogen gas to a rebalancing system to form a treated stream; and passing the treated stream to the positive electrolyte tank. An embodiment of the invention is one, any or all of prior embodiments in this paragraph up through the first embodiment in this paragraph wherein a redox active species in the negative electrolyte comprises Fe, or wherein a redox active species in the positive electrolyte comprises Fe, or both. An embodiment of the invention is one, any or all of prior embodiments in this paragraph up through the first embodiment in this paragraph wherein a redox active species in the negative electrolyte is plated on the negative electrode. An embodiment of the invention is one, any or all of prior embodiments in this paragraph up through the first embodiment in this paragraph further comprising a first rebalancing system in fluid communication with the negative electrolyte, or a second rebalancing system in fluid communication with the positive electrolyte, or both; and optionally, an additional filter upstream or downstream or both of the first rebalancing system; or an additional filter upstream or downstream or both of the second rebalancing system; or both. An embodiment of the invention is one, any or all of prior embodiments in this paragraph up through the first embodiment in this paragraph further comprising after filtering the negative electrolyte, or the positive electrolyte, or both in the at least one filter, cleaning the at least one filter. An embodiment of the invention is one, any or all of prior embodiments in this paragraph up through the first embodiment in this paragraph wherein there is a first filter between the negative electrolyte tank and the negative electrode and a second filter between the positive electrolyte tank and the positive electrode, and further comprising interrupting the flow of the negative electrolyte in the negative electrolyte loop by redirecting the first negative electrolyte stream through the second filter and to the negative electrode forming a second negative electrolyte loop; interrupting the flow of the positive electrolyte in the positive electrolyte loop by redirecting the first positive electrolyte stream through the first filter and to the positive electrode forming a second positive electrolyte loop; redirecting the first negative electrolyte stream to the first filter and reforming the negative electrolyte loop; and redirecting the first positive electrolyte stream to the second filter and reforming the positive electrolyte loop A second embodiment of the invention is a process for limiting circulation of precipitates in a redox flow battery system comprising providing at least one rechargeable cell comprising a negative electrode, a positive electrode, and a separator positioned between the negative electrode and the positive electrode, a negative electrolyte and a negative electrolyte tank, the negative electrolyte in contact with a negative electrode, and a positive electrolyte and a positive electrolyte tank, the positive electrolyte in contact with a positive electrode, wherein a redox active species in the negative electrolyte comprises Fe, or wherein a redox active species in the positive electrolyte comprises Fe, or both; circulating a flow of the negative electrolyte in a negative electrolyte loop, the negative loop comprising a first negative electrolyte stream from the negative electrolyte tank to the negative electrode and a second negative electrolyte stream from the negative electrode to the negative electrolyte tank, and circulating a flow of the positive electrolyte in a positive electrolyte loop, the positive electrolyte loop comprising a first positive electrolyte stream from the positive electrolyte tank to the positive electrode and a second positive electrolyte stream from the positive electrode to the positive electrolyte tank; and filtering the negative electrolyte, or the positive electrolyte, or both in at least one filter, wherein the at least one filter comprises a filter in the negative electrolyte loop, or a filter in the positive electrolyte loop, or both. An embodiment of the invention is one, any or all of prior embodiments in this paragraph up through the second embodiment in this paragraph wherein the filter in the negative electrolyte loop comprises one or more of a filter in the negative electrolyte tank, a filter on the first negative electrolyte stream, or a filter on the second negative electrolyte stream; or wherein the filter in the positive electrolyte loop comprises one or more of a filter in the positive electrolyte tank, a filter on the first positive electrolyte stream, or a filter on the second positive electrolyte stream; or both. An embodiment of the invention is one, any or all of prior embodiments in this paragraph up through the second embodiment in this paragraph further comprising a first rebalancing system in fluid communication with the negative electrolyte, or a second rebalancing system in fluid communication with the positive electrolyte, or both; and optionally, an additional filter upstream or downstream or both of the first rebalancing system; or an additional filter upstream or downstream or both of the second rebalancing system; or both.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for limiting circulation of precipitates in a redox flow battery system comprising:

providing at least one rechargeable cell comprising a negative electrode, a positive electrode, and a separator positioned between the negative electrode and the positive electrode, a negative electrolyte and a negative electrolyte tank, the negative electrolyte in contact with a negative electrode, and a positive electrolyte and a positive electrolyte tank, the positive electrolyte in contact with a positive electrode;

circulating a flow of the negative electrolyte in a negative electrolyte loop, the negative loop comprising a first negative electrolyte stream from the negative electrolyte tank to the negative electrode and a second negative electrolyte stream from the negative electrode to the negative electrolyte tank, and circulating a flow of the positive electrolyte in a positive electrolyte loop, the positive electrolyte loop comprising a first positive electrolyte stream from the positive electrolyte tank to the positive electrode and a second positive electrolyte stream from the positive electrode to the positive electrolyte tank; and filtering the negative electrolyte and the positive electrolyte in at least one filter;

wherein the redox flow battery comprises a Fe/Sn redox flow battery, a Fe/Ti redox flow battery, a Fe/Cr redox flow battery, a Fe/Fe redox flow battery, a Fe/Zn redox flow battery, a V/V redox flow battery, a Zn/Br redox flow battery, or a Zn/Ce redox flow battery, wherein there is a first filter between the negative electrolyte tank and the negative electrode and a second filter between the positive electrolyte tank and the positive electrode, and further comprising:

interrupting the flow of the negative electrolyte in the negative electrolyte loop by redirecting the first negative electrolyte stream through the second filter and to the negative electrode forming a second negative electrolyte loop;

interrupting the flow of the positive electrolyte in the positive electrolyte loop by redirecting the first positive electrolyte stream through the first filter and to the positive electrode forming a second positive electrolyte loop;

redirecting the first negative electrolyte stream to the first filter and reforming the negative electrolyte loop; and redirecting the first positive electrolyte stream to the second filter and reforming the positive electrolyte loop.

2. The process of claim 1 wherein the at least one filter comprises a filter in the negative electrolyte loop and a filter in the positive electrolyte loop.

3. The process of claim 2:

wherein the filter in the negative electrolyte loop comprises one or more of a filter in the negative electrolyte tank, or a filter on the first negative electrolyte stream, or a filter on the second negative electrolyte stream; or wherein the filter in the positive electrolyte loop comprises one or more of a filter in the positive electrolyte tank, or a filter on the first positive electrolyte stream, or a filter on the second positive electrolyte stream; or both.

4. The process of claim 1 further comprising:

interrupting the flow of the negative electrolyte in the negative electrolyte loop by redirecting the first negative electrolyte stream to form a second negative electrolyte loop, the second negative electrolyte loop comprising a third negative electrolyte stream from the negative electrolyte tank returning directly back to the negative electrolyte tank;

interrupting the flow of the positive electrolyte in the positive electrolyte loop by redirecting the first positive electrolyte stream to form a second positive electrolyte loop, the second positive electrolyte loop comprising a third positive electrolyte stream from the positive electrolyte tank to the negative electrode and from the negative electrode to the positive electrolyte tank;

redirecting the third positive electrolyte stream to the positive electrode and reforming the positive electrolyte loop; and redirecting the third negative electrolyte stream to the negative electrode and reforming the first negative electrolyte loop.

5. The process of claim 4 further comprising:

passing a portion of the third positive electrolyte stream and hydrogen gas to a rebalancing system to form a treated stream; and passing the treated stream to the positive electrolyte tank.

6. The process of claim 1 further comprising:

interrupting the negative electrolyte loop by redirecting the second negative electrolyte stream to the positive electrolyte tank and interrupting the positive electrolyte loop by redirecting the second positive electrolyte stream to the negative electrolyte tank; and redirecting the second negative electrolyte stream to the negative electrolyte tank and reforming the negative electrolyte loop and redirecting the second positive electrolyte stream to the positive electrolyte tank and reforming the positive electrolyte loop.

7. The process of claim 6 further comprising;

passing a portion of the first positive electrolyte stream and hydrogen gas from the negative electrolyte tank to a rebalancing system to form a treated stream; and passing the treated stream to the negative electrolyte tank.

8. The process of claim 1 further comprising:

interrupting the negative electrolyte loop by redirecting the first negative electrolyte stream to the positive electrolyte tank and interrupting the positive electrolyte loop by redirecting the first positive electrolyte stream to the negative electrolyte tank; and redirecting the first negative electrolyte stream to the negative electrolyte tank and reforming the negative electrolyte loop and redirecting the first positive electrolyte stream to the positive electrolyte tank and reforming the positive electrolyte loop.

9. The process of claim 8 further comprising;

passing a portion of the first positive electrolyte stream and hydrogen gas to a rebalancing system to form a treated stream; and passing the treated stream to the positive electrolyte tank.

10. The process of claim 1 further comprising:

interrupting the negative electrolyte loop by redirecting the first negative electrolyte stream to form a second negative electrolyte loop, the second negative electrolyte loop comprising a third negative electrolyte stream from the negative electrolyte tank returning directly back to the negative electrolyte tank, and interrupting the positive electrolyte loop by redirecting the first positive electrolyte stream to form a second positive electrolyte loop, the second positive electrolyte loop comprising a third positive electrolyte stream from the positive electrolyte tank returning directly back to the positive electrolyte tank; and redirecting the first negative electrolyte stream to the negative electrolyte tank and reforming the negative electrolyte loop and redirecting the first positive electrolyte stream to the positive electrolyte tank and reforming the positive electrolyte loop.

11. The process of claim 10 further comprising;

passing a portion of the third positive electrolyte stream and hydrogen gas to a rebalancing system to form a treated stream; and passing the treated stream to the positive electrolyte tank.

12. The process of claim 1 wherein a redox active species in the negative electrolyte comprises Fe, or wherein a redox active species in the positive electrolyte comprises Fe, or both.

13. The process of claim 1 wherein a redox active species in the negative electrolyte is plated on the negative electrode.

14. The process of claim 1 further comprising:

a first rebalancing system in fluid communication with the negative electrolyte, or a second rebalancing system in fluid communication with the positive electrolyte, or both; and optionally, an additional filter upstream or downstream or both of the first rebalancing system; or an additional filter upstream or downstream or both of the second rebalancing system; or both.

15. The process of claim 1 further comprising:

after filtering the negative electrolyte, or the positive electrolyte, or both in the at least one filter, cleaning the at least one filter.

16. A process for limiting circulation of precipitates in a redox flow battery system comprising:

providing at least one rechargeable cell comprising a negative electrode, a positive electrode, and a separator positioned between the negative electrode and the positive electrode, a negative electrolyte and a negative electrolyte tank, the negative electrolyte in contact with a negative electrode, and a positive electrolyte and a positive electrolyte tank, the positive electrolyte in contact with a positive electrode, wherein a redox active species in the negative electrolyte comprises Fe, or wherein a redox active species in the positive electrolyte comprises Fe, or both;

circulating a flow of the negative electrolyte in a negative electrolyte loop, the negative loop comprising a first negative electrolyte stream from the negative electrolyte tank to the negative electrode and a second negative electrolyte stream from the negative electrode to the negative electrolyte tank, and circulating a flow of the positive electrolyte in a positive electrolyte loop, the positive electrolyte loop comprising a first positive electrolyte stream from the positive electrolyte tank to the positive electrode and a second positive electrolyte stream from the positive electrode to the positive electrolyte tank; and filtering the negative electrolyte and the positive electrolyte in at least one filter, wherein the at least one filter comprises a filter in the negative electrolyte loop and a filter in the positive electrolyte loop, wherein there is a first filter between the negative electrolyte tank and the negative electrode and a second filter between the positive electrolyte tank and the positive electrode, and further comprising:

interrupting the flow of the negative electrolyte in the negative electrolyte loop by redirecting the first negative electrolyte stream through the second filter and to the negative electrode forming a second negative electrolyte loop;

interrupting the flow of the positive electrolyte in the positive electrolyte loop by redirecting the first positive electrolyte stream through the first filter and to the positive electrode forming a second positive electrolyte loop;

redirecting the first negative electrolyte stream to the first filter and reforming the negative electrolyte loop; and redirecting the first positive electrolyte stream to the second filter and reforming the positive electrolyte loop.

17. The process of claim 16 wherein the filter in the negative electrolyte loop comprises one or more of a filter in the negative electrolyte tank, a filter on the first negative electrolyte stream, or a filter on the second negative electrolyte stream; or wherein the filter in the positive electrolyte loop comprises one or more of a filter in the positive electrolyte tank, a filter on the first positive electrolyte stream, or a filter on the second positive electrolyte stream; or both.

18. The process of claim 16 further comprising:

a first rebalancing system in fluid communication with the negative electrolyte, or a second rebalancing system in fluid communication with the positive electrolyte, or both; and optionally, an additional filter upstream or downstream or both of the first rebalancing system; or an additional filter upstream or downstream or both of the second rebalancing system; or both.

* * * * *